June 18, 1935.  V. J. TICHOTA  2,005,525
DRAFT EQUALIZER
Filed June 13, 1934
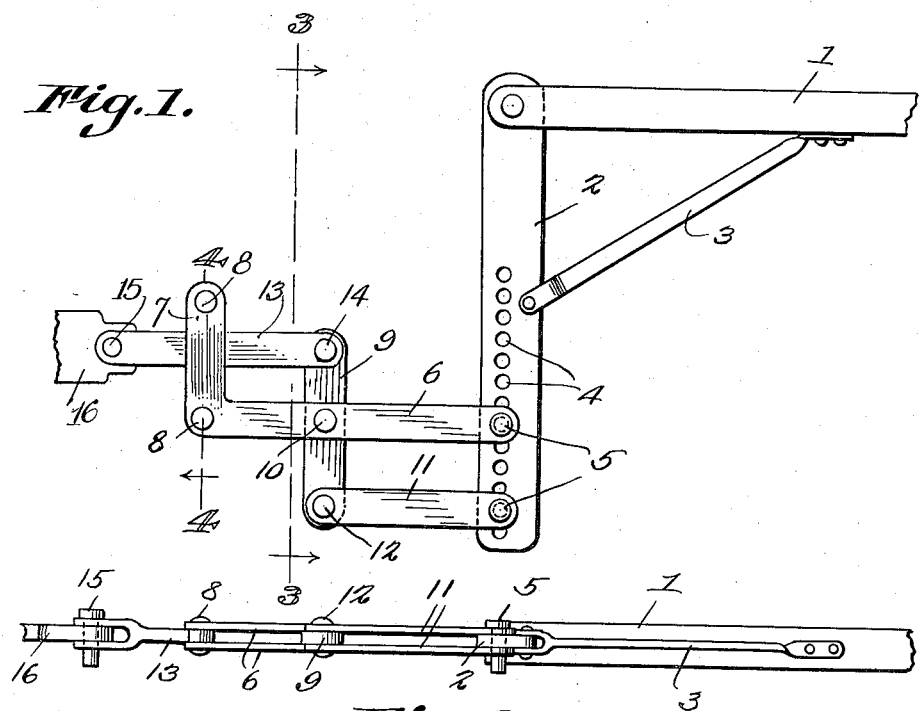
Fig. 1.
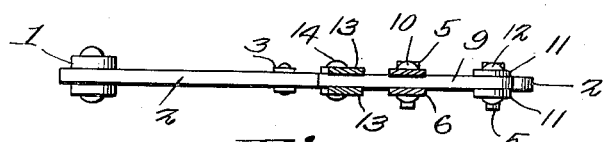
Fig. 2.
Fig. 3.
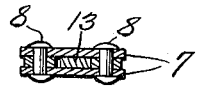
Fig. 4.
V. J. Tichota
Inventor
By C. A. Snow & Co.
Attorneys.

Patented June 18, 1935

2,005,525

UNITED STATES PATENT OFFICE 2,005,525

DRAFT EQUALIZER

Vencel J. Tichota, Dodge, Nebr.

Application June 13, 1934, Serial No. 730,506

1 Claim. (Cl. 280—33.44)

This invention relates to a draft equalizer of the same general type as that disclosed in the patent issued to me on January 12, 1932, No. 1,840,754.

It is the purpose of this invention to provide a draft equalizer which enables the draft to be exerted at a point located laterally beyond the plow beam so that while the tractor or draft animals connected to the plow are traveling on the unbroken land at one side of the furrow the plow will be drawn along its proper path and there will be no tendency to pull either the plow or the tractor laterally out of correct position.

An object of the invention is to simplify the construction of the draft equalizer so as to reduce its weight and cost and to produce a structure of this character which overcomes side draft to an extent heretofore deemed impractical.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing

Figure 1 is a plan view of the draft equalizer, a portion of a tractor hitch being shown at the front end thereof while the back end is connected to a plow beam.

Figure 2 is a side elevation.

Figure 3 is a section on line 3—3, Figure 1.

Figure 4 is a section on line 4—4, Figure 1.

Referring to the figures by characters of reference 1 designates the forward portion of a plow beam or the like having a laterally extended arm 2 which is held fixed relative thereto in any suitable manner, as by means of a brace 3. Arm 2 can be formed with a longitudinal series of apertures 4 any of which are adapted to receive coupling bolts 5 for joining the equalizer to the beam arm 2.

The equalizer includes superposed levers 6 which are pivotally joined at one end to arm 2 by one of the pins or bolts 5. The arm is extended between these levers as shown.

The other ends of the levers are formed with laterally extending arms 7 and these arms are joined by spaced stop pins 8 or the like.

A transverse lever 9 is extended between levers 6 and is pivotally connected thereto as at 10. One arm of lever 9 is connected by links 11 to arm 2, one of the pins or bolts 5 serving to join these links to the arm detachably while another pin 12 or the like pivotally connects the links to lever 9.

The other arm of lever 9 has the forked end of a link 13 pivotally connected thereto as shown at 14. This link is extended loosely between the arms 7 so as to slide freely between pins 8 which also serve to limit the swinging movement of the link relative to levers 6. At the front end of link 13 there is a coupling pin 15 or the like for joining it to a tractor hitch 16 or other draft means.

Obviously the levers 6 and links 11 can be joined to arm 2 at points located any desired distances laterally from the center line of beam 1. Should the beam 1 be drawn forwardly by a tractor located at one side of the path of the beam and directly connected thereto the natural tendency of the beam and the tractor would be to swing into a line which would extend forwardly obliquely to the left in Figure 1. This tendency to side draft is offset by the present improvements. It has been found in actual practice that when a draft hitch or the like is joined to the forward end of the floating link 13 and pulled forwardly this action, coupled with the resistance offered by the soil, will result in lever 9 pulling forwardly through levers 6 and links 11 upon the arm 2. As these parts form a parallelogram the tendency of arm 2 will be to swing to the right in Figure 1 away from the line of draft through hitch 16.

In practice this tendency has been found to substantially offset the normal tendency of the plow to swing toward the hitch with the result that ultimately the plow is brought to position pointing straight ahead where it will remain even though the hitch may be spaced 20 inches or more laterally from the line of the plow.

What is claimed is:

A draft equalizer for transmitting forward motion to a plow or the like from a tractor or other draft means spaced laterally from the path of movement of the plow and without shifting the plow out of its predetermined path of movement, which includes an arm rigidly connected to and extending laterally from the plow beam, a link pivotally connected to and extending forwardly from the arm, a lever pivotally connected to and extending forwardly from the arm and beyond the link, a transverse lever fulcrumed to the forwardly extending lever and having one arm pivotally connected to the link, guide means extending laterally from the front end of the forwardly extending lever, and a link for coupling the other arm of the transverse lever to a draft device, said link being movable freely within the guide means.

VENCEL J. TICHOTA.